(12) United States Patent
Craig et al.

(10) Patent No.: US 7,620,617 B2
(45) Date of Patent: *Nov. 17, 2009

(54) ABSTRACTION LAYER FOR PRESENTING CONFIGURATION INFORMATION TO A CALLER

(75) Inventors: Robert M Craig, Bellevue, WA (US); William D. Devlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 438 days.

This patent is subject to a terminal disclaimer.

(21) Appl. No.: 11/106,811

(22) Filed: Apr. 14, 2005

(65) Prior Publication Data

US 2005/0177566 A1 Aug. 11, 2005

Related U.S. Application Data

(63) Continuation of application No. 10/154,705, filed on May 22, 2002, now Pat. No. 6,917,933, which is a continuation of application No. 09/360,560, filed on Jul. 26, 1999, now Pat. No. 6,421,682.

(51) Int. Cl.
G06F 7/00 (2006.01)
G06F 17/30 (2006.01)
(52) U.S. Cl. .............................. 707/2; 707/3
(58) Field of Classification Search ............... 707/1–10, 707/100, 101, 102, 103 R, 103 X, 103 Y, 707/103 Z, 104.1; 709/201–203, 212–216; 713/1
See application file for complete search history.

(56) References Cited

U.S. PATENT DOCUMENTS

| 5,485,617 | A |   | 1/1996  | Stutz et al. |
|-----------|---|---|---------|--------------|
| 5,517,645 | A |   | 5/1996  | Stutz et al. |
| 5,655,148 | A |   | 8/1997  | Richman et al. |
| 5,689,703 | A |   | 11/1997 | Atkinson et al. |
| 5,706,505 | A |   | 1/1998  | Fraley et al. |
| 5,761,499 | A | * | 6/1998  | Sonderegger ................ 707/10 |
| 5,794,038 | A |   | 8/1998  | Stutz et al. |
| 5,809,303 | A | * | 9/1998  | Senator ...................... 719/325 |
| 5,822,580 | A |   | 10/1998 | Leung |
| 5,842,018 | A |   | 11/1998 | Atkinson et al. |
| 5,911,068 | A |   | 6/1999  | Zimmerman et al. |
| 6,003,097 | A |   | 12/1999 | Richman et al. |
| 6,085,030 | A | * | 7/2000  | Whitehead et al. .......... 709/203 |
| 6,421,682 | B1|   | 7/2002  | Craig et al. |
| 6,513,112 | B1|   | 1/2003  | Craig et al. |
| 6,598,037 | B1|   | 7/2003  | Craig et al. |
| 6,687,710 | B1|   | 2/2004  | Dey |

(Continued)

OTHER PUBLICATIONS

Dale Rogerson, *Inside COM*, 1997; Chapter 6, pp. 116-126.

(Continued)

*Primary Examiner*—Tim T. Vo
*Assistant Examiner*—Garrett Smith
(74) *Attorney, Agent, or Firm*—Merchant & Gould PC

(57) ABSTRACT

An abstraction layer in a catalog management system for accessing system configuration information. The catalog management system presents the configuration information that is stored in a datastore to a computer process by storing the information in cache memory so that the datastore is encapsulated from the caller. The request for the configuration information may be both location independent and type independent.

21 Claims, 9 Drawing Sheets

U.S. PATENT DOCUMENTS 6,917,933 B2    7/2005    Craig et al.

OTHER PUBLICATIONS

Distributed Computing Monitor, vol. 13, No. x; *COM+ The Future of Microsoft's Component Object Model*, Featured Report by David Chappell, pp. 3-17, date unknown.

A Case for Meta-internetworking Protecting CORBA Meta-data into Com, Smith et al., Proceedings of the 1998 Conference on Technology of Object-Oriented Languages, Nov. 23-26, 1998, pp. 242-253, IEEE 98TB100271.

* cited by examiner

ABSTRACTION LAYER FOR PRESENTING CONFIGURATION INFORMATION TO A CALLER

RELATED APPLICATIONS

This application claims the benefit of priority and is a continuation of U.S. application Ser. No. 10/154,705, filed May 22, 2002, which claims the benefit of priority and is a continuation of U.S. application Ser. No. 09/360,560, filed on Jul. 26, 1999 entitled CATALOG MANAGEMENT SYSTEM ARCHITECTURE HAVING DATA TABLE OBJECTS AND LOGIC TABLE OBJECTS, now U.S. Pat. No. 6,421,682, both of which are incorporated herein by reference.

TECHNICAL FIELD

The invention relates generally to object-oriented data processing and system management, and more particularly to a layer of abstraction providing location and type independence in accessing configuration information in a catalog environment.

BACKGROUND OF THE INVENTION

Many executable software programs or applications require access to system-wide, configuration-type information at times when the application is being installed or modified on a computer system, i.e., at configuration time and at the time the application is executed to perform its intended function, i.e., at run time. The application needs to access configuration information related to available resources on the local computer system and through connected computers across a computer network. These resources include available software and hardware tools as well as available services offered by the system that improve the functionality of the program within the overall system.

Accessing this information is typically done through direct access to a "registry" located on each computer system. The registry is simply a place to store and read configuration information. Meanwhile, a transaction management system provides services through embedded logic to an application. The services may relate to such items as security, validation, roles, etc. as well as network communication and conflict management.

The services are typically exploited through an attribute-based programming scheme which allows program developers to specify the services and resources required by an application by setting properties (or "attributes") of each application or component rather than implementing or calling those services directly from the implementation code. Attributes include a particular set of configuration information that is made available to various callers in an attribute-based environment.

Even in an attribute-based programming environment, the application desiring data and services must know where the information comes from in the system. Moreover, the program typically must know the format that the information is stored in to be able to access the information. In existing approaches, the system registry has been used to store configuration data for a particular machine. However, in existing approaches, a programmer was required to access and manipulate registry information directly, introducing undesirable program complexity and exposing the registry to corruption by improper programming. Moreover, the distribution of configuration information among multiple datastores (i.e., in addition to the registry) and data formats is not accommodated by existing approaches, particularly if the location and format of data is expected to evolve over time. In current approaches, the implementation code itself must be altered in order to handle location and format changes to configuration information. Accordingly, existing approaches lack location and format independence that can provide the desired flexibility for storage and access to configuration information in a computer system.

It is with respect to these and other aspects that the present invention has been made.

SUMMARY OF THE INVENTION

The present invention relates to an abstraction layer in a catalog management system for accessing system configuration information. The catalog management system presents the configuration information that is stored in a datastore to a computer process caller. In order to present the information to the caller, the catalog management system retrieves the information and then stores it in cache memory so that the datastore is encapsulated from the caller. The request for the configuration information may be both location independent and type independent.

In accordance with preferred aspects, the present invention relates to an abstraction layer having a data table object interface module and a logic table object module. The data table object module has a cache memory module which is accessible by the caller and is adapted to store the configuration information to be presented to the caller. The data table object module also has a datastore interaction code module which is adapted to retrieve the configuration information from the datastore and populate the memory with the information. The logic table object has an interception/delegation module which intercepts calls from the caller and delegates commands to the data table object interface module to provide an additional layer of processing. The abstraction layer preferably uses a wiring database to determine the location of the datastores to provide the configuration information.

These and various other features as well as advantages which characterize the present invention will be apparent from a reading of the following detailed description and a review of the associated drawings.

DETAILED DESCRIPTION OF THE INVENTION

An embodiment of the present invention relates to a catalog management system that uses logic table objects and data table objects, which are distinct units of program code known as "objects" to present configuration information from one or more datastores in a computer system to a requesting or calling program, i.e., a caller. The logic and data table objects provide a layer of abstraction between the caller and the datastores alleviating the caller from needing to know the actual location of the datastore housing the configuration information or the format in which the information in the datastore is stored. Moreover, the layer of abstraction provides access to configuration information from one or more datastores at the same time. The caller merely provides a request for the information, using a relatively high level description of the information and the catalog management system of the present invention determines the location of the requested information and presents the information to the caller in a meaningful format. The catalog maintains a "wiring database" that is recursively called to construct the proper logic and data table objects of the abstraction layer which ultimately presents the configuration information to the caller.

Figure 1:
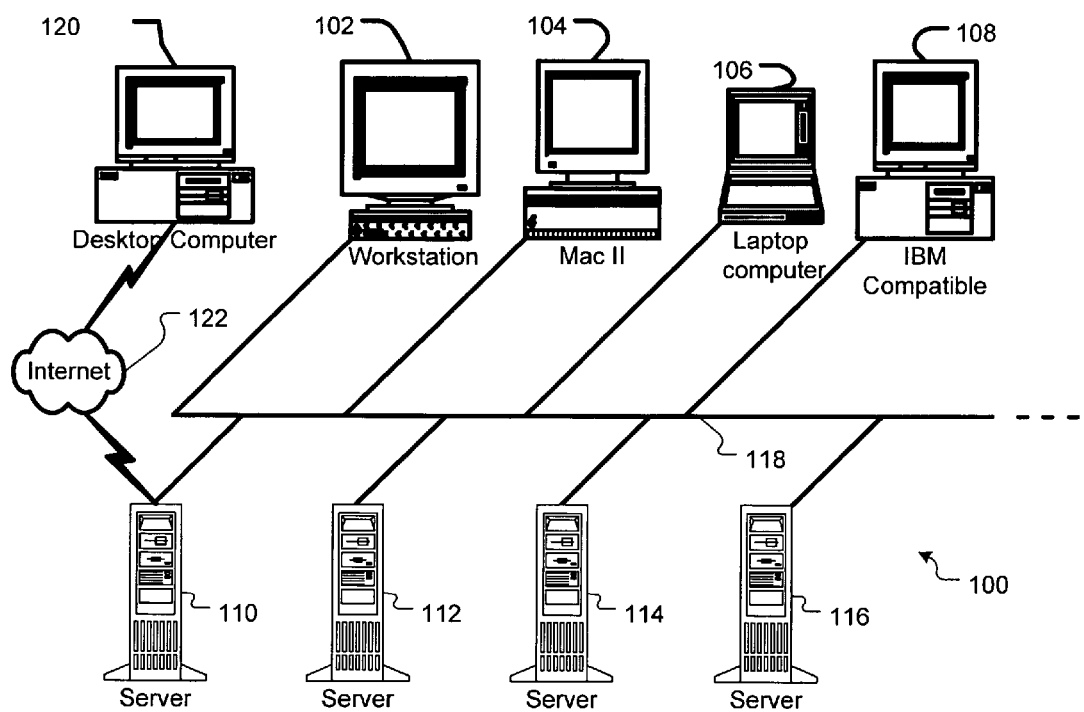
FIG. 1 illustrates a pictorial representation of a suitable client-server computing environment in which an embodiment of the present invention may be implemented in both clients and servers.

A computing environment 100 in which an embodiment of the present invention may be implemented is shown in FIG. 1. Client computer systems 102, 104, 106 and 108 are connected to server computer systems 110, 112, 114 and 116 by a network connection 118. Additionally, client computer 120 is connected to server computer 110 via a communications link, such as the Internet 122. Since the server 110 is connected via the network connection 118 to the other servers 112, 114 and 116, the client computer 120 is also connected and may access information on the other servers 112, 114 and 116.

The client computer systems 102, 104, 106, 108 and 120 operate using at least some of the information and processes available on at least one of the servers 110, 112, 114 and 116. Additionally, the clients 102, 104, 106, 108 and 120 can each access the various shared resources provided by any other computer on the network 100. Each client is a complete, stand-alone personal computer and offers the user a full range of power and features for running applications. The clients 102, 104, 106 and 108, however, may have different operational features as compared to the other clients, but each client is able to communicate with the servers and other clients via the common interface 118.

The servers 110, 112, 114 and 116 are either personal computers, minicomputers, or a mainframes that provide traditional strengths offered by minicomputers and mainframes in a time-sharing environment: data management, information sharing between clients, and sophisticated network administration and security features. The client and server machines work together to accomplish the processing of the application being used. Working together in this manner increases the processing power and efficiency related to each independent computer system shown in FIG. 1.

Typically, the client portion of an application executed in the distributed network 100 is optimized for user interaction whereas the server portion provides the centralized, multi-user functionality. However, each client computer 102, 104, 106, 108 and 120 can perform functions for other computers, including the clients and servers, thus acting as a "server" for that other computer system. Similarly, each of the servers 110, 112, 114 and 116 can perform functions and relay information to the other servers, such that each server may actually be a "client" requesting information or services from another computer in particular circumstances. Therefore, the term "client," as used hereinafter refers to any computer system making a call or request of another computer system and the term "server" is the computer system that services the request.

On the other hand "client processes," which refer to operations that request information or services from "server processes" may actually be communicating on the same machine. Therefore, the term "caller" is used hereinafter to indicate a client-type process that requests information or services from another operation or process.

As part of the sophisticated network administration, each computer must be able to access applications and resources available on the other computers in the network 100 and therefore must be able to access configuration data related to the applications and resources available on the other computers. The configuration data is located within memory on each computer system, i.e., in a datastore. Additionally, each computer system typically has more than one datastore of configuration information that needs to be accessed by the other computer systems. Moreover, the different datastores may each have different data types or formats. In order to access configuration information from these many and various computer datastores, a client or caller, i.e., the system or process making the request for information, communicates with a "catalog" interface on the server computer system.

Figure 2:
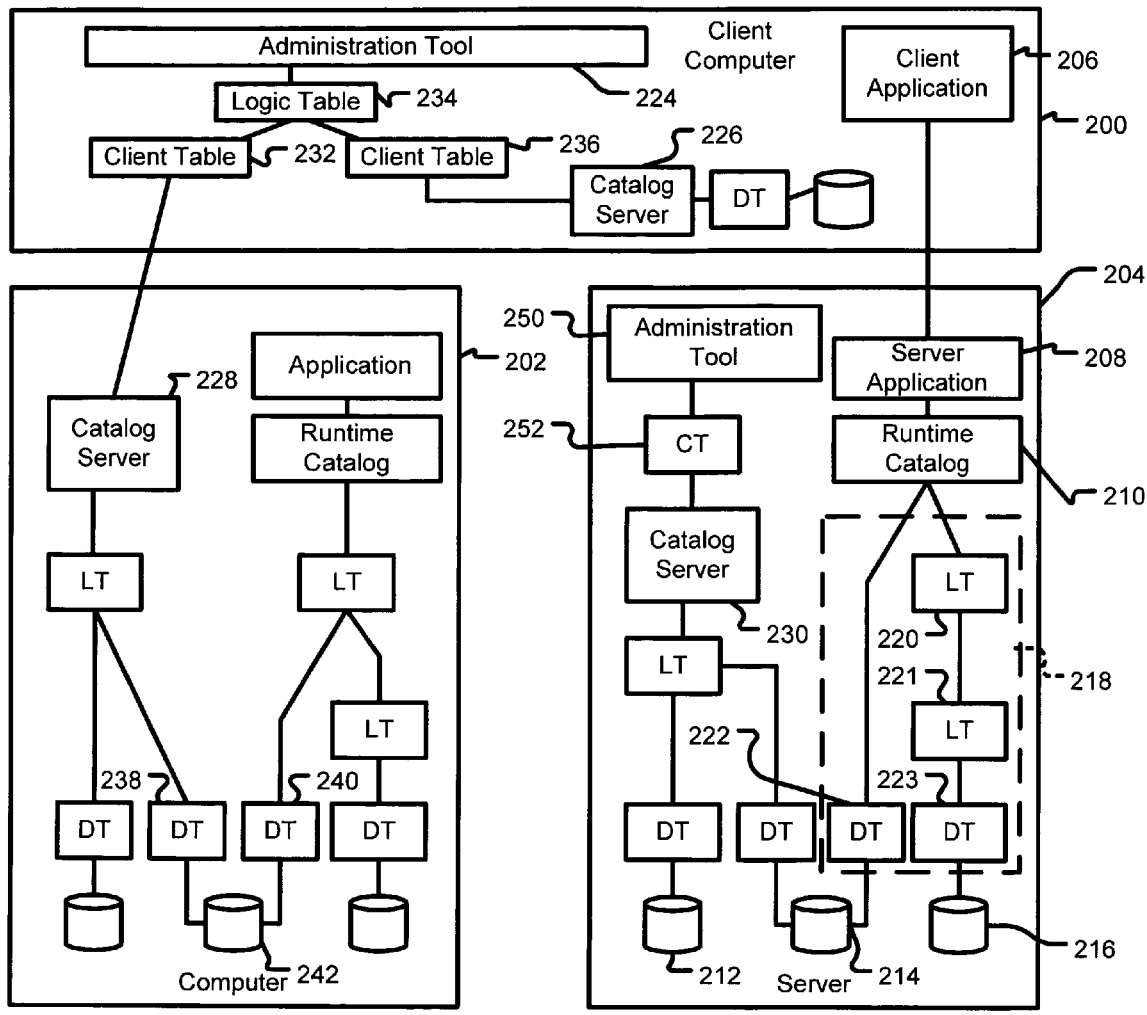
FIG. 2 depicts an exemplary client/server architecture employing both runtime and configuration time catalog systems in accordance with the present invention.

FIG. 2 depicts an exemplary client/server architecture employing COM+ catalogs in accordance with the present invention (COM is an acronym for Component Object Model). A COM+ Catalog is a virtualized database of COM+ applications and their services, with runtime and configuration-time abstraction layers for using and manipulating configuration information. An embodiment of the present invention, for example, may be employed in a component-based programming model of a transaction processing runtime environment for developing, deploying, and managing high-performance, scaleable, and robust enterprise Internet and intranet server applications.

A "component" is software containing classes that may be created and exposed as "objects" (i.e., self-contained programmed entities that consist of both data and functions to manipulate the data) for use by another application. A component can also use objects exposed by another application. For example, a developer can create an application using ActiveX components that can be updated and managed easily as in-process DLLs (Dynamic Link Libraries). The DLLs are then installed into the COM environment for execution within the application. Components can be developed specifically for a developer's single application, developed for use with multiple applications, or purchased from a third party.

COM technology allows a piece of software to offer services to another piece of software by making those services available as "COM objects." COM is a foundation for an object-based system that focuses on reuse of interfaces. It is also an interface specification from which any number of interfaces can be built. Each COM object is an instance of a particular class and supports a number of interfaces, generally two or more. Each interface includes one or more methods, which are functions that can be called by the objects' clients.

COM+ technology is an extension of COM technology that includes a new runtime library that provides a wide range of new services, such as dynamic load balancing, queued components, an in-memory database, and events. COM+ technology maintains the basics of COM technology, and existing COM-based applications can continue to work unchanged in a COM+ environment.

An object implemented to comply with COM+ is referred to as a "COM+ object". A component that includes one or more classes that may be instantiated as a COM+ object is referred to as a "COM+ component". Each COM+ component has attributes, which can be set in a component (or type) library. Attributes are a form of configuration data required by many software components to execute correctly and completely. An application that includes COM+ components is referred to as a "COM+ application". When a component is made part of a COM+ application, its component (or type) library is written into a COM+ catalog. When an object is instantiated from that component, the attributes in the COM+ catalog are examined to determine the object context that contains properties for the object. Based on the object context, other services required by the object are provided. In this manner, a developer can merely identify in the attributes the additional functionality required by the object, and based on the object's attributes, the appropriate other services that are available within the system, or the accessible network, are executed to provide that functionality.

In FIG. 2, a client computer 200 is coupled via a network to one or more remote computers (e.g., a computer 202 and a server 204). Although the embodiments of the present invention are illustrated and described herein relative to multiple computer systems coupled by a computer network or other communications connection, it is to be understood that an embodiment of the present invention may be employed in a stand-alone computer system to provide access to configuration information in the system.

A client application 206 executes on the client computer 200 to access a server application 208 executing on the server 204. For example, the server application 208 may include a database application that receives a query from the client application 206 and accesses a customer database (not shown) for all customer data satisfying the query. During operation, the server application 208 may require configuration data recorded in a datastore (such as datastores 214 or 216). For example, a transaction server application can determine the security level of a user according to a "role" assigned to the user by an administrator or other means. Accordingly, the transaction server application might query a role definitions database to validate the user's access to a transaction database (not shown). In another example, the server application 208 accesses configuration information to verify that required services are available for its execution.

To obtain configuration information in the illustrated embodiment, the server application 208 accesses a runtime catalog 210 running on the server 204. The runtime catalog 210 causes one or more table object dispensers to create catalog table objects (shown generally as table system 218) providing the required configuration data in a table to the server application 208. A "table object" includes an object that provides a caller with access to underlying data, presenting that data in virtual "table" format through a defined table interface. A table object may also provide its own functionality, read and write caching and the triggering of external events, in addition to other features. The table data is accessed by a caller (e.g., a catalog server, a runtime catalog, or an overlaying logic table object) by way of a table-oriented interface, preferably including table cursor methods. In the exemplary embodiment, the runtime catalog 210 accesses configuration data in the datastores 214 and 216 through layers of abstraction provided by the table system 218 (i.e., including logic table objects ("LT"), such as logic table object 220, and data table objects ("DT"), such as data table object 222).

A globally unique database identifier ("DID") identifies each catalog database. A given DID guarantees a minimum well-defined set of catalog tables, each table being identified by and complying to the rules of a table identifier ("TID"). A DID is a datastore-independent identity, meaning that the tables of that database can be distributed among multiple datastores. Examples of datastores include the registry, type libraries, SQL (structured query language) Servers, and the NT Directory Service (NT DS), whereas examples of databases include: server group databases, download databases, and deployment databases.

A data table object, such as data table object 222, is a datastore-dependent table object that exposes a table cursor into a particular datastore. The table cursor provides a well-defined table-oriented interface into the datastore while hiding the location and format of the underlying datastore itself. For example, a caller can use a table cursor to navigate through the rows of a column in a table presented to the caller by a table object.

Each data table object is bound to a particular datastore accessible within the computer. For example, a data table object may be bound to the registry to provide the registry data in table form to a higher level (e.g., an overlaid logic table object, catalog server object, or runtime catalog). Another data table object may be bound to the NT Directory Services to provide directory configuration data to a higher level. As shown by data table objects 238 and 240, multiple data table objects may be created for a single datastore (e.g., data table objects 238 and 240 are created by different logic tables objects to provide access to the same datastore 242).

The data table object 222 populates one or more internal caches with read or write data associated with the datastore 214. Queries to the datastore 214 are serviced by the cache or caches through the data table object's table interface. Using at least one "update" method, data in the read cache of the data table object 222 may be refreshed from the datastore 214 and data in a write cache may be flushed to the datastore 214. Data table objects are described in more detail below and in U.S. Pat. No. 6,598,037, entitled "DATA TABLE OBJECT INTERFACE FOR DATASTORE," assigned to the assignee of the present application and incorporated herein by reference for all that it discloses and teaches.

A logic table object, such as logic table object 220, presents domain-specific table data by logically merging or consolidating table data from multiple data table and/or logic table objects, supplementing table functionality, and/or synthesizing data into the table, in accordance with a given type of configuration information requested (e.g., configuration information for Components, Applications, etc.). The domain-specific nature of the table data is preferably defined by at least one table dispenser input parameter, including without limitation a database ID, a table ID, a query parameter, or a level of service parameter). Logic table objects in a COM+ Catalog environment are type-independent abstraction layers between a caller (such as the runtime catalog 210) and one or more datastores (such as datastores 214 and 216) containing configuration information. A logic table object typically sits atop one or more data table objects and introduces domain-specific rules and processes to the underlying data table objects, although other configurations of table systems are possible (see FIG. 4).

More specifically, a logic table object can logically merge or consolidate configuration data from multiple data table and/or logic table objects into a single table based on predetermined logic (e.g., according to type). Furthermore, a logic table object can supplement data table object functionality by intercepting interface calls from a client and adding to or overriding the underlying table object functionality (e.g., adding validation or security). Additionally, a logic table object can synthesize data that is not available from the underlying datastores or tables and present the synthesized data as part of the table. Logic table objects are described in more detail below and in U.S. patent application Ser. No. 09/364,440, entitled "A LOGIC TABLE ABSTRACTION LAYER FOR ACCESSING CONFIGURATION INFORAMTION," assigned to the assignee of the present application and incorporated by reference for all that it discloses and teaches.

The foregoing discussion has described the COM+ Catalog environment as used at runtime by an application. An alternate use of a COM+ Catalog occurs at configuration-time and may employ one or more catalog server objects ("CS") and one or more client table objects. During configuration, an administration tool, such as Microsoft's Component Services administration tool or COMAdmin Library, is used to create and configure COM+ applications, install and export existing COM+ applications, manage installed COM+ applications, and manage and configure services locally or remotely. Accordingly, in addition to the illustrated embodiments, an embodiment of the present invention may be employed by a local administration tool managing an application running on a remote computer system.

The exemplary administration tool 224 executes on the client computer 200 in FIG. 2. An alternative administration tool (such as administration tool 250) can execute on another computer (such as server 204) to configure applications and services executing in the computer. A catalog server object, such as catalog server objects 226, 228, and 230, manages configuration information on its computer. All administration requests to a computer, whether local or from another computer, go to a catalog server object on that computer, preferably through one or more abstraction layers, including client table objects and logic table objects.

A client table object ("CT") is analogous to a data table object that binds to a particular local or remote catalog server object instead of a datastore, presenting the configuration information marshaled by a catalog server object in table form to the caller, such as the administration tool 224. The local catalog server object 226 manages configuration data locally on the client computer 200, while the remote catalog server object 228 service catalog requests from the client table object 232 for configuration information on its remote computer. "Remote" does not necessarily imply that a remote computer geographically distant from a local computer. Instead, remote merely indicates a cross-computer boundary, which may be bridged by a data bus, a network connection, or other connection means.

To access available catalog data in the illustrated exemplary embodiment, the administration tool 224 optionally causes a logic table object 234 to be created, which in turn causes client table objects 232 and 236 to be created for accessing available catalog server objects 226, and 228. The local catalog server object 226 and the remote catalog server object 228 marshal the configuration information stored within their corresponding computers by causing creation of underlying table systems and transferring the data back to the client table objects 232 and 236 for presentation as table data to the logic table object 234, which logically merges the configuration information and presents the configuration information to the administration tool 224 in table format. In the illustrated embodiment, multiple domain-specific logic table objects (such as logic table object 234) can reside between the client table objects 232 and 236, and the administration tool 224. Alternatively, the administration tool 224 may cause only a single client table object (with or without overlaying logic table objects) to be created to access a single catalog server object on a local or remote computer.

Figure 3:
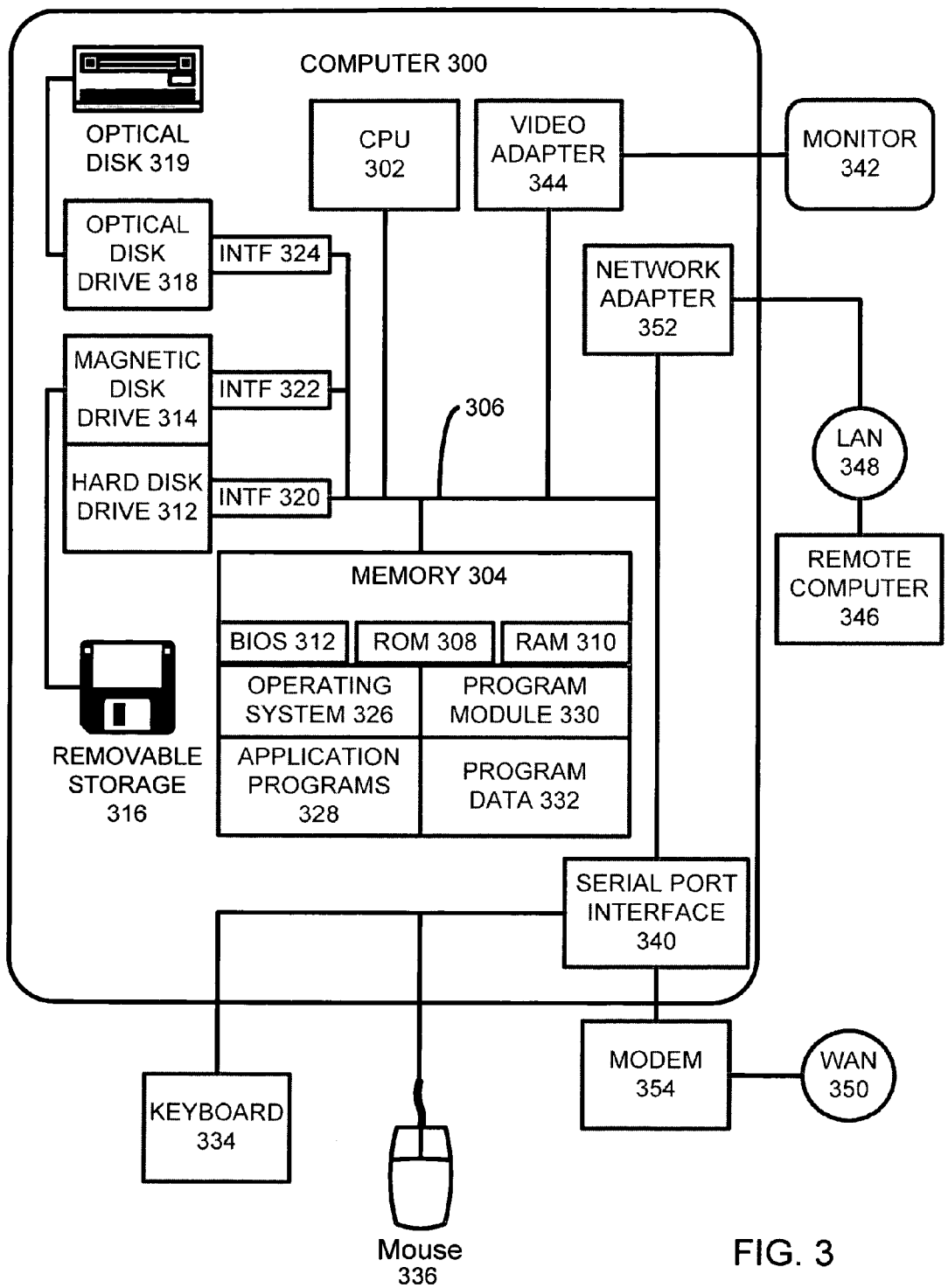
FIG. 3 illustrates an exemplary system for implementing the invention in an embodiment of the present invention.

With reference to FIG. 3, an exemplary computing system for embodiments of the invention includes a general purpose computing device in the form of a conventional computer system 300, including a processor unit 302, a system memory 304, and a system bus 306 that couples various system components including the system memory 304 to the processor unit 300. The system bus 306 may be any of several types of bus structures including a memory bus or memory controller, a peripheral bus and a local bus using any of a variety of bus architectures. The system memory includes read only memory (ROM) 308 and random access memory (RAM) 310. A basic input/output system 312 (BIOS), which contains basic routines that help transfer information between elements within the computer system 300, is stored in ROM 308.

The computer system 300 further includes a hard disk drive 312 for reading from and writing to a hard disk, a magnetic disk drive 314 for reading from or writing to a removable magnetic disk 316, and an optical disk drive 318 for reading from or writing to a removable optical disk 319 such as a CD ROM, DVD, or other optical media. The hard disk drive 312, magnetic disk drive 314, and optical disk drive 318 are connected to the system bus 306 by a hard disk drive interface 320, a magnetic disk drive interface 322, and an optical drive interface 324, respectively. The drives and their associated computer-readable media provide nonvolatile storage of computer readable instructions, data structures, programs, and other data for the computer system 300.

Although the exemplary environment described herein employs a hard disk, a removable magnetic disk 316, and a removable optical disk 319, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 316, optical disk 319, ROM 308 or RAM 310, including an operating system 326, one or more application programs 328, other program modules 330, and program data 332. A user may enter commands and information into the computer system 300 through input devices such as a keyboard 334 and mouse 336 or other pointing device. Examples of other input devices may include a microphone, joystick, game pad, satellite dish, and scanner. These and other input devices are often connected to the processing unit 302 through a serial port interface 340 that is coupled to the system bus 306. Nevertheless, these input devices also may be connected by other interfaces, such as a parallel port, game port, or a universal serial bus (USB). A monitor 342 or other type of display device is also connected to the system bus 306 via an interface, such as a video adapter 344. In addition to the monitor 342, computer systems typically include other peripheral output devices (not shown), such as speakers and printers.

The computer system 300 may operate in a networked environment using logical connections to one or more remote computers, such as a remote computer 346. The remote computer 346 may be a computer system, a server, a router, a network PC, a peer device or other common network node, and typically includes many or all of the elements described above relative to the computer system 300. The network connections include a local area network (LAN) 348 and a wide area network (WAN) 350. Such networking environments are commonplace in offices, enterprise-wide computer networks, intranets, and the Internet.

When used in a LAN networking environment, the computer system 300 is connected to the local network 348 through a network interface or adapter 352. When used in a WAN networking environment, the computer system 300 typically includes a modem 354 or other means for establishing communications over the wide area network 350, such as the Internet. The modem 354, which may be internal or external, is connected to the system bus 306 via the serial port interface 340. In a networked environment, program modules depicted relative to the computer system 300, or portions thereof, may be stored in the remote memory storage device. It will be appreciated that the network connections shown are exemplary, and other means of establishing a communications link between the computers may be used.

In an embodiment of the present invention, the computer system 300 stores the configuration data and implementation code providing the catalog infrastructure and disclosed and claimed herein in accordance with the present invention. The catalog infrastructure has without limitation one or more datastores, catalog servers, runtime catalogs, server applications, administration tools, dispensers, and wiring databases. Specifically, one or more dispensers, preferably including a table dispenser and an table object dispenser, provide a table object to a caller providing location and type independent access to configuration information stored in one or more datastores.

The embodiments of the invention described herein may be implemented as logical operations in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, or modules.

Figure 4:
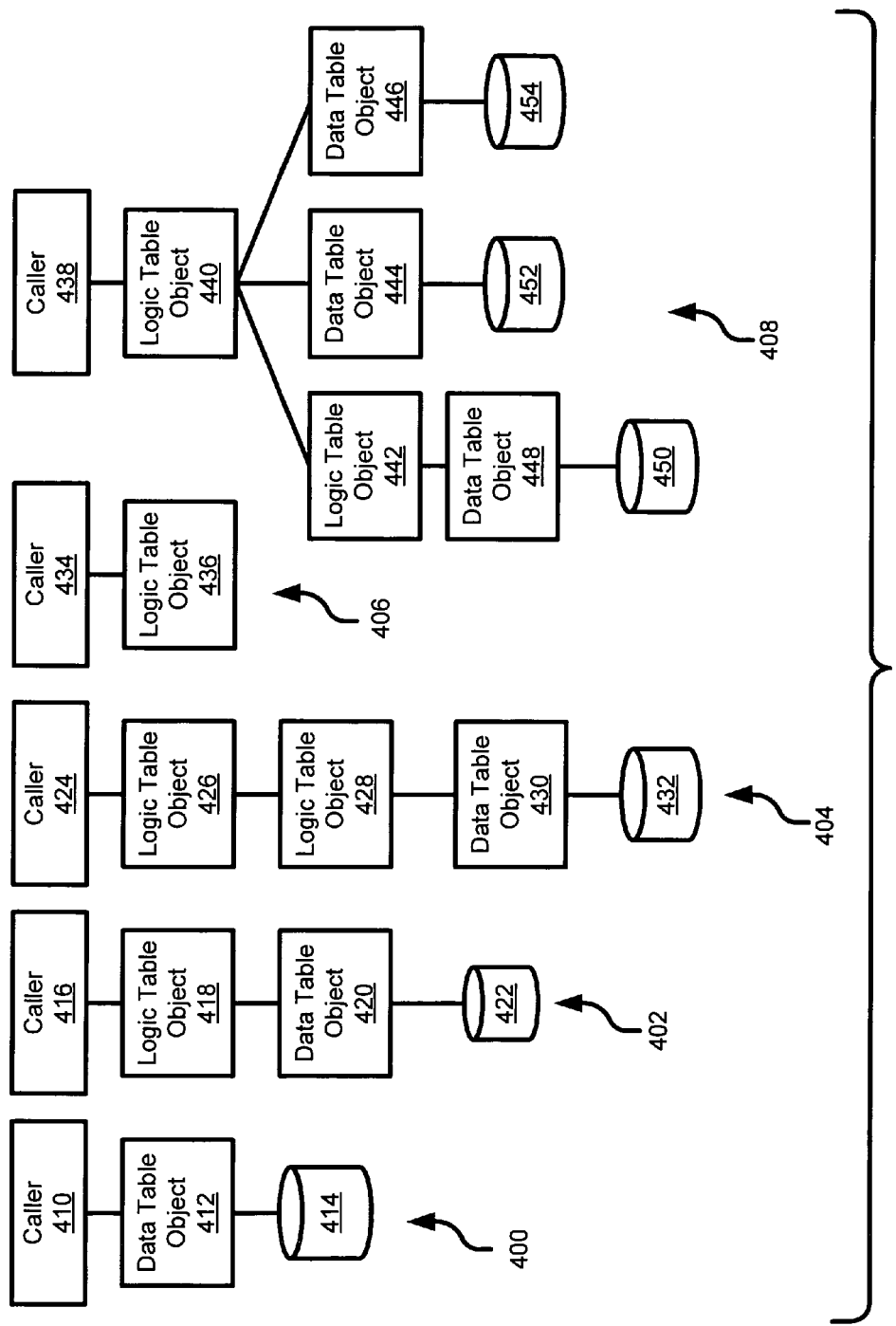
FIG. 4 depicts various examples of logic table and data table combinations in embodiments of the present invention.

FIG. 4 depicts various examples of table systems in embodiments of the present invention. Logic table and data table objects are described in the description of FIG. 2 and the incorporated references. With regard to a table system 400, a caller 410 (as well as other callers in FIG. 4) may be a catalog server, a runtime catalog, or another object requiring abstracted access to a datastore. To initiate access to requested information, the caller 410 provides input parameters, such as a database ID, a table ID, query parameters, and a level of service parameter, relating to the configuration information it is requesting. A table dispenser (see the table dispenser 502, for example, in FIG. 5A) returns to the caller 410 a pointer to a table object, in this case a single data table object 412 bound to a datastore 414. Through a table interface accessible via the pointer to the data table object 412, the caller 410 can access tabularized configuration data (i.e., a data level table) originating from the datastore 414.

With regard to a table system 402, the table dispenser provides a caller 416 with an interface of a logic table object 418, which overlays a data table object 420. The data table object 420 is bound to a datastore 422 and provides access to a data level table of configuration data originating from the datastore 422 to the logic table object 418. Through a table interface provided to caller 416, the logic table object 418 can present to the caller a logic level table of configuration information, including without limitation (1) a remapping (i.e., an alternate table configuration) of the data provided by data table object 420; (2) supplemental functionality (e.g., validation of data); and (3) synthesized data (e.g., data not resident in datastore 422, but instead, data derived or calculated from data in datastore 422 or another source). The logic table object 418 can also trigger external operations. These features of a logic table object are described in greater detail in the previously incorporated U.S. patent application Ser. No. 09/360,440, entitled "A LOGIC TABLE ABSTRACTION LAYER FOR ACCESSING CONFIGURATION INFORMATION."

With regard to a table system 404, two levels of logic table objects (i.e., logic table objects 426 and 428) are positioned between a caller 424 and a data table object 430, which is bound to a datastore 432. Preferably, functionality is modularized using multiple logic table objects. For example, the logic table object 426 may be responsible for enforcing security constraints on accesses to configuration data, whereas the logic table object 428 may validate data before writing configuration data to the datastore 432. Other functional combinations are possible at the discretion of the developer. In an embodiment of the present invention, the combinations of logic table and data table objects required to satisfy a requested database ID and table ID are specified in a wiring database accessed by the table dispenser, as discussed more completely below.

With regard to a table system 406, a caller 434 has access to configuration data through a logic table object 436 without an underlying data table object or datastore. The logic table object 436 may provide table-based synthesized data to the caller or otherwise provide or trigger functionality outside the scope of the catalog's tables. For example, the logic table object 436 may intercept calls to an unsupported datastore and return errors to the caller 434. Alternatively, the logic table object 436 may translate or remap table data originally provided by the caller 434 or an external source, rather than by a datastore.

With regard to a table system 408, a caller 438 gains access to configuration data originally stored in or derived from datastores 450, 452, or 454. A logic table object 440 logically merges or consolidates data from a logic table object 442, data table object 444, which is bound to datastore 452, and data table object 446, which is bound to datastore 454. The logic table object 442 overlays a data table object 448, which is bound to datastore 450. In this configuration, the logic table object 440 logically merges data from the underlying catalog tables and presents the configuration data as a logic level table to the caller 438. The data table objects 448, 444 and 446, respectively each translate the requested information as needed, which is discussed more completely below in combination with FIG. 6.

Using combinations of information from various datastores illustrates the concept of location independence. One call by the caller with a single table ID and a single database ID and a query gains access to configuration from many different locations. Indeed, the caller request does not specify any location information, merely the configuration information requested. Moreover, the table system 408 illustrates the concept of type independence in that the data from each of the datastores 450, 452 and 454 may all be of different type and format.

Figure 5:
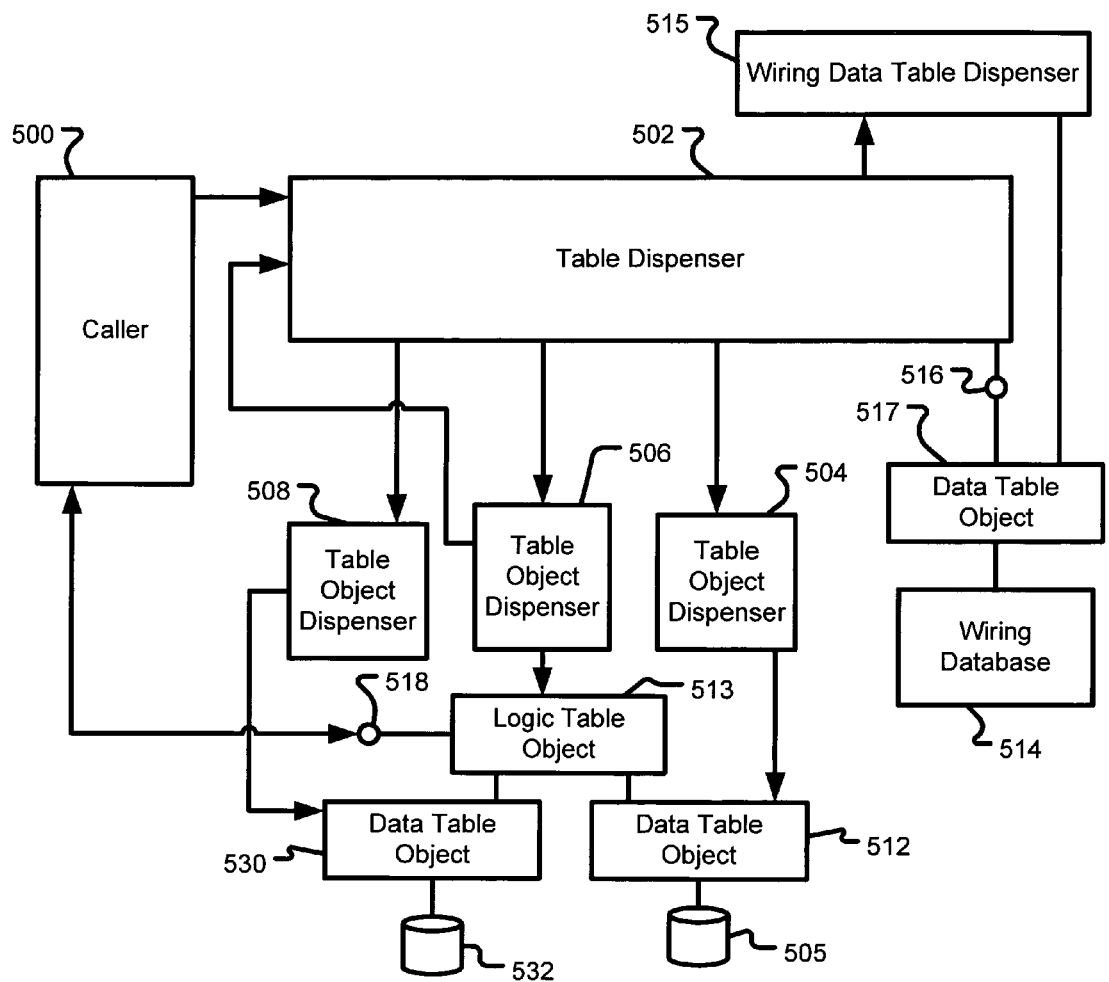
FIG. 5 depicts a table dispenser system for dispensing logic and data table objects such as those depicted in FIGS. 2 and 4.

FIG. 5 depicts a block diagram of a table dispenser system for dispensing a catalog table system (such as systems 400, 402, 404, 406 and 408 in FIG. 4) in an embodiment of the present invention. More Details of the table implementation dispenser system shown in FIG. 5 and briefly discussed below are described in U.S. Pat. No. 6,466,943, entitled "OBTAIN- ING TABLE OBJECTS USING TABLE DISPENSERS," assigned to the assignee of the present application and incorporated herein by this reference.

Caller 500, which could include a catalog server or a runtime catalog, specifies the table data it requires by passing input parameters to the table dispenser 502. Although FIG. 5 depicts a catalog-oriented caller, the table dispenser 502 can be used more generally to provide abstraction levels between a caller and one or more datastores, without being limited to catalogs or configuration data. For example, a wiring data table dispenser 515 is used to provide a data table object 517 for accessing data in the wiring database 514.

The caller 500 passes input parameters to the table dispenser 502. In an embodiment of the present invention, the input parameters include identity, query, and level of service parameters. The identity parameter preferably includes a database ID and a table ID to specify the database and table from which the caller 500 is requesting configuration data.

The query may include a query format parameter, a query meta parameter, and a query data parameter, all of which may be NULL pointers. The query format parameter indicates the specific format of the query and governs the nature of input data passed in the query meta and query data parameters.

The query itself may be formatted in various ways. A first possible query form includes a unicode query string and a unique identifier of its format, such as supported in the SQL (Structured Query Language). A second possible query form includes a simple "and/or" query format that supports a "Boolean search"-type query. In alternative embodiments, other query forms may be used.

The level of service includes a table of flags identifying attributes of the requested table. One level of service relates to read only, which reduces overhead and increases performance since no write cache is allocated. Other levels of service in a preferred embodiment that may be requested include "non-marshalable" which presents information that cannot be marshaled across processes and systems; "single cursor" or "multi-cursor" which relates to the number of cursors available when navigating the cached table of configuration information wherein each cursor indicates the table cell of data to be read or written in the resulting table of configuration information; "empty write cache" which provides an empty write cache and no read cache when no reading is expected; "incoming" which guarantees that the first client call to the table implementation will consume a marshallable table; and "no logic" which obtains a data table directly, omitting any intervening logic tables.

Upon receiving the identity of the requested table, the table dispenser 502 queries a wiring database 514 for general wiring instructions. The wiring database 514 is accessed via a data table 517 that provides a defined interface 516 to the wiring information stored in the wiring database 514. The data table object 517 is dispensed to the table dispenser 502 by a wiring data table dispenser 515. Based on the database ID and the table ID provided by the caller, the table dispenser 502 retrieves a first level of wiring instructions from the wiring database 514, and potentially other ancillary wiring databases (not shown). The wiring instructions may be a compilation of database specific or table specific wiring information, including the class IDs and related locators for one or more table object dispensers (i.e., specific data table dispensers or logic table dispensers) corresponding to the provided database ID and table ID.

After querying the wiring database 514, the table dispenser 502 creates one or more table object dispensers (such as table object dispenser 504, 506 and 508) specified in the wiring information, passing forward the identity, query, and level of service parameters. The table object required to provide a requested virtual table of configuration information to the caller 500 may require a combination of data table and logic table objects. In the embodiment shown in FIG. 5, the table dispenser 502 reads a wiring relationship corresponding to the provided identity parameters from the wiring database 514 through the data table object 517. The wiring relationship indicates both a logic table object dispenser 506 and the data table object dispenser 504 to satisfy the table request from the caller 500. Accordingly, the table dispenser 502 calls the data table object dispenser 504 to create the data table object 512, binding it to the datastore 505. The table dispenser 502 then calls the logic table object dispenser 506 to dispense the logic table object 513, passing a pointer to the data table object 512 in the calling parameters (i.e., binding the logic table object 513 to the data table object 512). For purposes of this discussion, the data table object 512 is referred to as a lower-level or sub-table object of logic table object 513.

The logic table object dispenser 506 is programmed to reuse other virtual tables to satisfy requests from callers. Rather than providing the entire underlying table object itself, the table object dispenser 506 can rely on other table object dispensers (such as dispenser 508) to provide portions of the data or logic for the requested table. That is, the table object dispenser 506 is programmed to call the table dispenser 508 with the identity (database IDs and table IDs), queries, and levels of service for a sub-table. The table dispenser 502 then re-queries the wiring database 514 with the new set of database IDs and table IDs to obtain the appropriate wiring information for each sub-table object dispenser, which the table dispenser 502 uses to call the corresponding data table object dispenser 508. The data table object dispenser 508 dispenses a data table object 530, which is bound to datastore 532.

Furthermore, this recursion can continue until the desired logic table object 513 is dispensed. As each sub-table object is instantiated, a pointer to the sub-table is passed up to the next overlaying table object, until the multiple table objects and/or multiple levels of table objects are combined to present a requested table interface 518 from the resulting logic table object 513. Alternatively, a resulting table object may be in one of many assorted table system combinations, including those illustrated in FIGS. 2 and 4.

In the illustrated embodiment, the logic table object 513 and two sub-table objects (512 and 530) are dispensed to provide the caller 500 with the requested virtual table of configuration data through the table interface 518. The configuration data provided through the table interface 518 is sourced from datastores 505 and 532 in FIG. 5.

Figure 6:
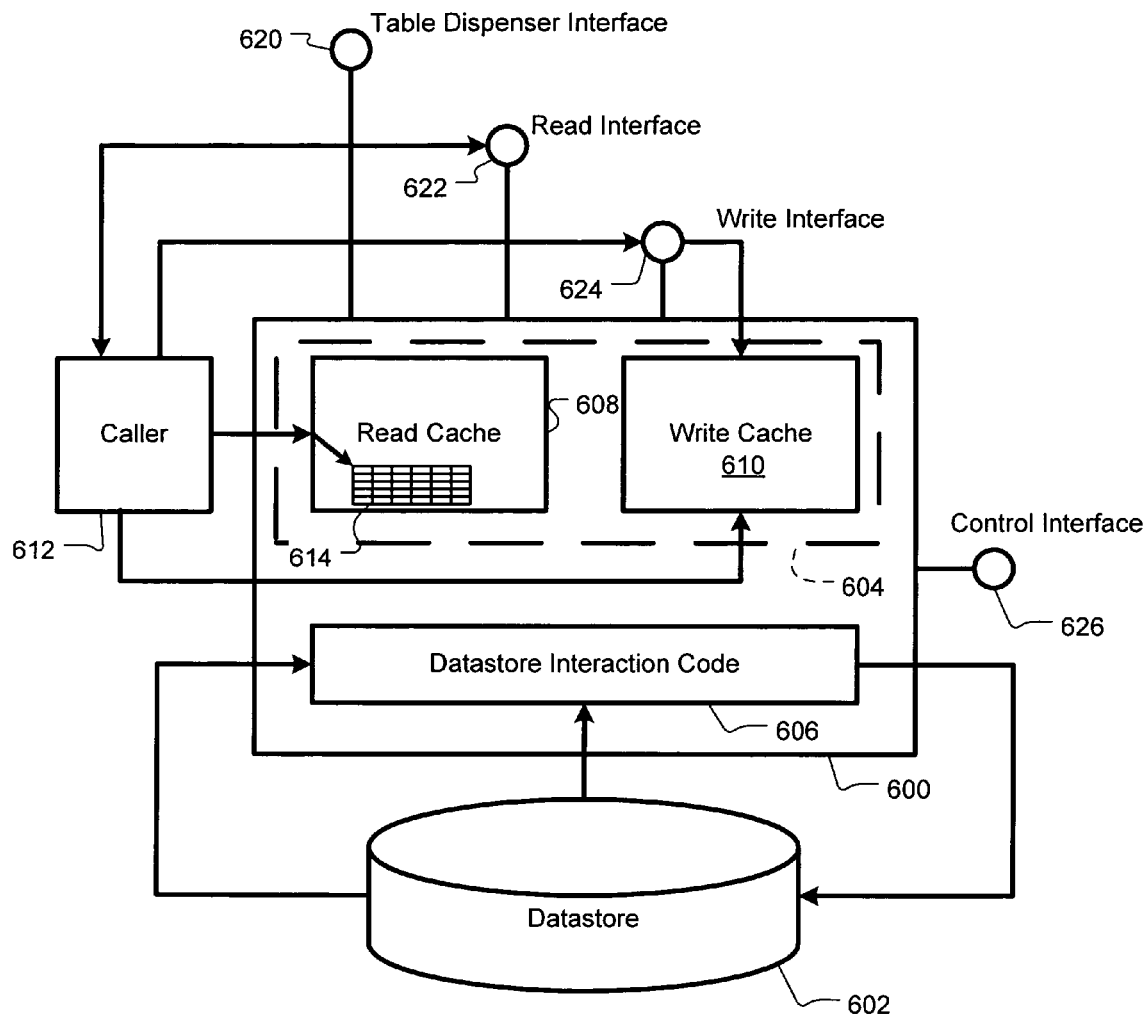
FIG. 6 shows a data table object, such as one of the data tables shown in FIGS. 2 and 4.

In order to access configuration data from any of the datastores shown in FIGS. 2 and 4, a data table, such as data table object 600 shown in FIG. 6, is created and used as an interface to the configuration information in the datastore. The data table object 600 interacts with a datastore 602, both reading information out of the datastore 602 and writing information to the datastore 602. The data table object 600 has a memory cache 604 and datastore interaction code 606 that performs the interaction between the datastore 602 and the cache 604. Preferably, the data table object 600 is the only interface mechanism used by the COM+ catalog (FIGS. 2 and 4) to access the configuration information in the datastore 602 such that the data table object 600 prevents caller applications from directly accessing the information in the datastore 602, i.e., encapsulates the information. Instead, the caller operates on the cached information copied into cache 604 from the datastore 602. Preferably the information is copied into the cache 604 creating a data level table 614 of configuration information that has a general row and column table format.

The datastore interaction module or code 606 receives commands from the caller and executes the commands on the datastore 602. The commands are preferably generic stemming from a predetermined set of recognized commands, i.e., a "standardized interface," and the commands do not depend on the type of datastore 602 or the type of actual commands used to access information in the datastore. Instead, the datastore interaction code 606 translates the particular commands into proper format and/or sequence of specific actions necessary to access information in the particular datastore 602. For example, the datastore may be the registry and the datastore interaction code 606 for accessing information in the registry may be different from the datastore interaction code (not shown) for a different data table that accesses an SQL database. However, the commands sent by the caller are standardized such that the caller merely makes a type-independent request not knowing what type of datastore is being used and the datastore interaction code 606 handles the translation. The standardized command set enables the creation of new and different datastores by merely implementing the datastore interaction code related to the datastore format.

The datastore interaction code 606 interacts with the datastore 602 to populate the cache and update the datastore. That is, the code 606 receives commands from the caller requesting that the cache be populated with a specific portion of data from the datastore 602 based on a supplied query. Code 606 generates and conducts an interaction command to the datastore implementing the populate request to populate the cache with the requested information. That is, the data table code 606 translates the query into the proper format and/or necessary sequence of specific actions and requests the information based on the query. The query is related to the type of information, as opposed to requests that simply identify specific data.

Similarly, "update" datastore commands received by the data table object 600 are translated by the code 606 into the specific format and/or sequence of specific actions required to update or modify the datastore 602. Preferably, the code 606 is the only executable code of the catalog schema shown in FIG. 2 that is designed to modify the configuration information contents of the datastore 602. Such encapsulation decreases the probability that others can modify or tweak the operational parameters of the system and thereby jeopardize the integrity of the system.

Additionally, the code 606 may interact with the datastore based on control-type commands from the caller. Such control-type commands may include initialization of the datastore 602 or merely the transfer of data to the datastore unrelated to the requested configuration information.

Allocation of the cache 604 occurs during the creation of the data table 602. The cache 604 has a read cache 608 and a write cache 610. The read cache 608 is not modifiable and is populated with a specific configuration information table as a result of a query by a caller 612. Code 606 executes the query request and stores the returned information in tabular form in the read cache 608. The data table object 600 uses the write cache 610 to store proposed modifications or additions to the datastore configuration information. Such information is stored until the caller requests that the code 606 update the datastore. At that time the code 606 uses the write cache information to execute the update command.

In alternative embodiments, the cache 604 comprises only a read cache or a write cache. Such other embodiments are typically beneficial in particular circumstances when only reading or writing is desired since those embodiments provide better performance for quick reads or writes by providing a smaller working set for the caller. Preferably, the caller can choose a level of service that provides either the combined read and write cache 604 as shown in FIG. 6 or just a read cache 608 or just a write cache 610. Therefore, as little cache as necessary is allotted the data table object 600 during creation which frees additional memory in the computer system to be used by other processes.

Although the cache 604 and the code 606 are elements of the data table object 600, the cache and code are relatively distinct from each other. The code 606 simply performs operations using the cache 604. In essence, other data tables (not shown) could utilize the same physical cache memory 604, as long as it has not been allocated to data table object 600 or some other process.

The data table object 600 may be an instantiated COM object in the object-oriented catalog management system shown in FIGS. 2 and 4. As an object, the data table object 600 exposes interfaces that enable the caller to interact with the data table object 600 by supplying the caller with pointers to the interfaces. It is through these interfaces that the standardized methods are implemented for each data table. The data level table 614 is accessed through these methods enabling the user to read and write rows and columns of table 614.

The caller that interacts with the data table object 600 is either the catalog server, the runtime catalog or a logic table object, as shown in FIG. 2. Each of these potential callers may be an instantiated COM object as part of the COM+ catalog management system and therefore the caller 612 is a "trusted caller." Since the caller is trusted, it gets a pointer directly into the read cache 608. If the caller were not trusted, the caller copies the information to another portion of memory in order to maintain the integrity of the cache memory.

As a COM object, the data table object 600 shown in FIG. 6 has interfaces that are exposed wherein each interface provides various methods to the caller 612. The exposed set of interfaces are used by either the caller to read or write the data level table of configuration information presented to the caller in the cache 604 or by other processes to control the data table object 600. Interface 620, for example is not exposed to the caller but is used by the table dispenser to create the data table object 600. Interface 622 exposes read methods and allows the caller to access and manipulate the cursor within the read cache 608. Interface 624 exposes the write methods. Additionally, the interface 624 inherits from the read interface 622 so that the caller can perform read and write methods using interface 624. Additionally, the data table object 600 has a control interface 626 which exposes control-type methods not necessarily required to implement the data table object 600 but provide added functionality to the data table object 600.

The primary methods exposed by the data table object 600 generally include at least one populate method, at least one update method, and read/write/navigate methods. Additional methods are also preferably exposed to enhance the functionality of the data table object 600. The populate method relates to populating the read cache with data from the datastore 602 based on a supplied query. The update method updates the datastore using information stored in the write cache 610. The read/navigate methods allow for row navigation and enable the caller to view different rows in the configuration table or to view columns of information. Additionally, the data table object 600 provides write methods to place potential changes in the write cache and control-type methods that are exploitable by the caller 612.

Since most of the operations are performed on the information that is in cache the data in the datastore is generally encapsulated and protected from these operations. Indeed there are only three methods exposed that cause the code 606 of the data table object 600 to actually interact with the datastore 602. The methods include the read-only activity of populating the cache, the initialization method and the update store method.

Data table 600 presents configuration information in data level table 614 to the caller through these methods. In the case where the caller is a logic table, such as logic table object 221 in FIG. 2, the caller uses the data level table 614 to either create a logic level table for presentation to its caller or uses the information to activate other services or events. In the case where the caller is a catalog server, such as catalog server 226, then the data level table 614 may be marshaled to a client table object, such as client table object 232 or 236 shown in FIG. 2, located on the same computer. Or, in the case where the caller is a catalog server, such as catalog server 230, then the data level table 614 may be marshalled to a client table, such as client tables 236, located on a remote client computer.

Figure 7:
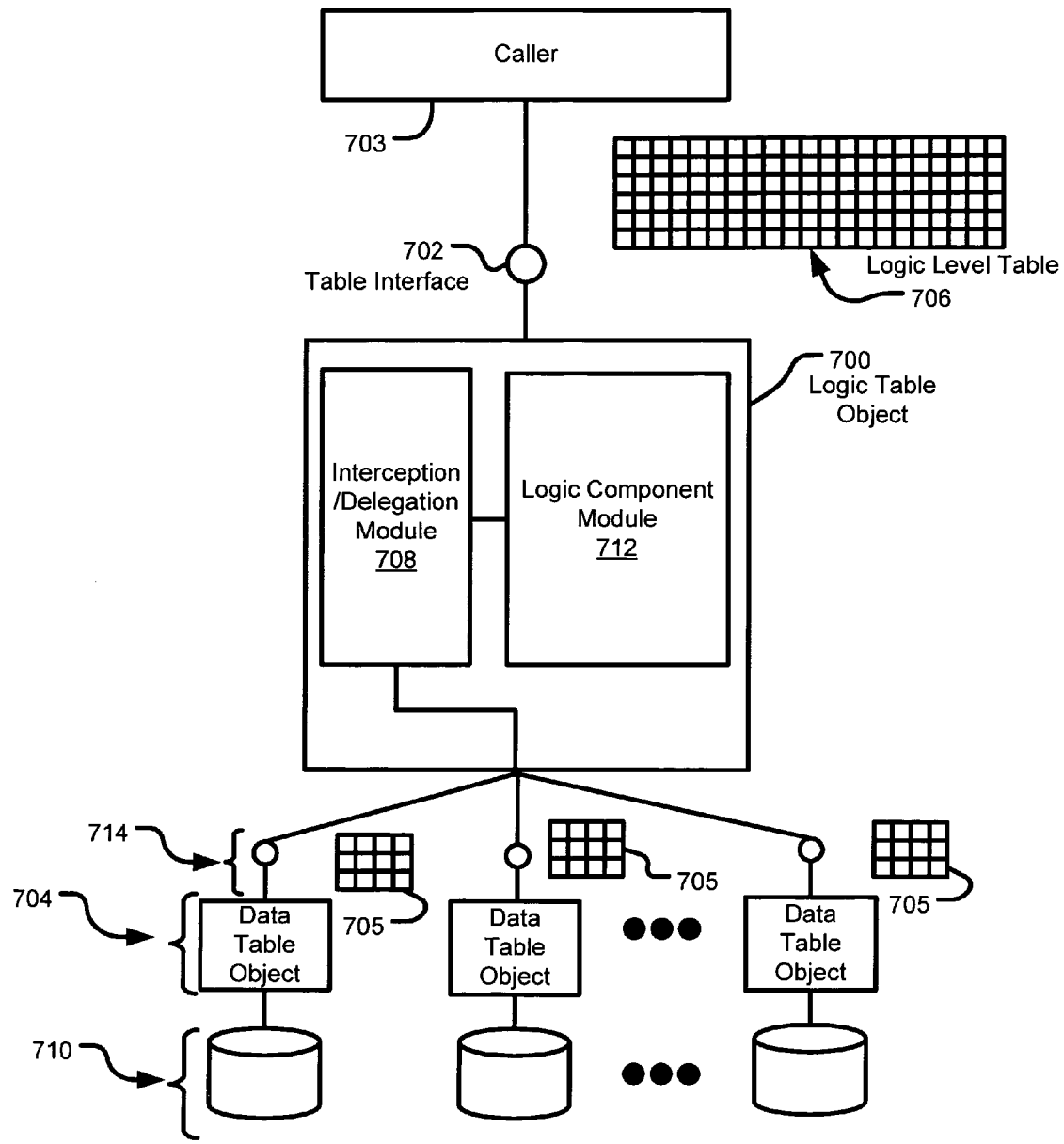
FIG. 7 shows a logic table abstraction layer used in combination with data table objects.

In order to present configuration information from at least one datastore, a logic table object 700 may be used to request information. Moreover, if more than one datastore of information is accessed, a logic table object 700 is used to request the information from the various datastores and to merge the configuration information for the caller as shown in FIG. 7. The logic table object 700 presents a table interface 702 to a caller 703. The table interface 702 is compatible with the interface presented by the data table objects 704 and may be identical to the data table interfaces 714. The table interface 702 includes methods for navigating rows of a logic level table 706, getting configuration information values in tabular form from a logic level table 706, writing to the logic level table 706, as well lower level operations such as updating the configuration information stored in a datastore, populating a data table object cache from a datastore, and other advanced operations.

In order to implement logic level table navigation and operations, the logic table interface 702 receives all cursor method calls from the caller 703. More specifically, the caller 703 requests an operation using the cursor method relating to the logic level table 706 of the logic table object 700. The caller requests the selected cursor method, passing appropriate parameters, to perform a particular function provided by the cursor method.

The operations that occur on the other side (i.e., the logic table side) of the table interface 702 are transparent to the caller 703. As such, the cursor method initiated by the caller in the logic table object 700 can be directly delegated to an appropriate data table object 704 or intercepted by the logic table object 700 to perform supplemental functionality, synthesize data, trigger external operations, re-map and/or combine data into logic level table 706 from data level tables 705 of the data table objects 704, and from other logical processing as programmed in the logic table object 700.

In an embodiment of the present invention, a logic table object 700 provides an abstraction layer between a caller, which is presented with a logic level table 706, and one or more data table objects 704, which are bound to respective datastores 710. The logic table object 700 includes an interception/delegation module 708, which maps the logic level table 706 to cursor methods and/or data in the logic table object 700. The interception-delegation module 708 of the illustrated embodiment may also delegate calls to the table interface of one or more of the data tables 704. By delegating, the logic table object 700 effectively passes the caller through to one or more underlying data table objects. By intercepting, however, the logic table 700 can provide additional logic (e.g. supplemental functions, synthesized data, and mapping/consolidation) responsive to the call.

Depending on the specific configuration of the logic table object 700, the additional logic provided by an interception event may include consolidation of configuration information from multiple underlying data table objects and/or logic table objects. Logic table objects may additionally or alternatively supplement underlying table object functionality by intercepting cursor method calls from a client and adding to or overriding the underlying table object functionality. Alternately or additionally, the logic table object 700 can synthesize data that is not available from the underlying datastores or table objects and present the synthesized data as part of the logic level table 706 presented to the caller. This additional logic is provided by one or more logic component modules 712.

The interception/delegation module 708 may also provide functions that may not necessarily be "intercepted" in that the module 708 may provide functions called by the user directly. The caller may request the function or service, such as dealing with security or another service, where the request is implemented from the logic table object 700, as requested by the caller.

Figure 8:
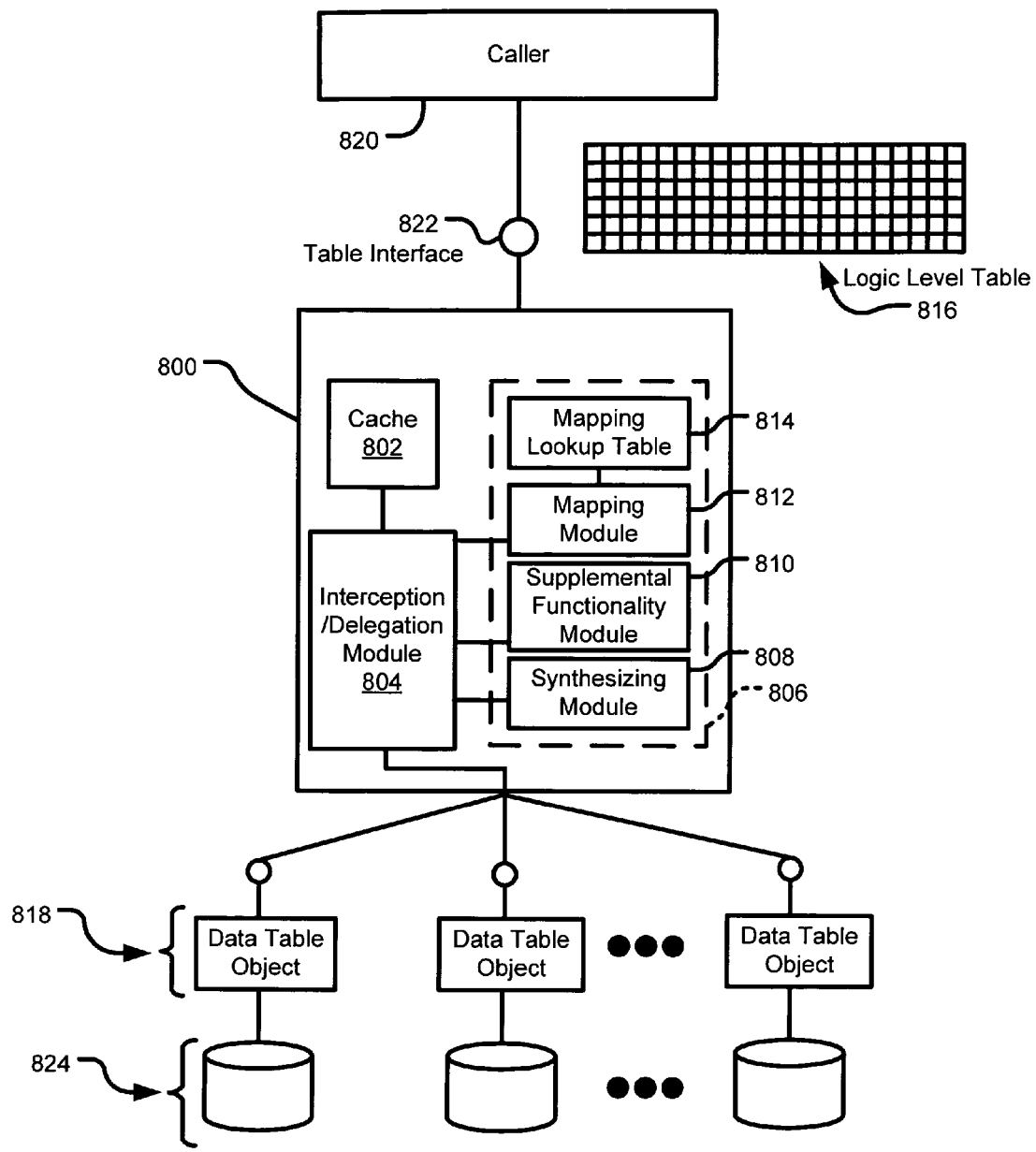
FIG. 8 illustrates a logic table abstraction layer implementing embedded logic used in combination with data table objects.

A logic table implementation 800 in an embodiment of the present invention comprises a cache 802, an interception-delegation module 804 and logic component modules 606 as shown in FIG. 8. The logic component modules 806 have one or more synthesizing modules 808, one or more supplemental functionality modules 810, or one or more mapping modules 812 and a mapping lookup table 814. It should be understood that many combinations of the cache 802, the synthesizing module 808, the supplemental functionality module 810, and the mapping module 812 are possible within the scope of the present invention. That is, depending on the requirements of the logic table object, a logic table dispenser may include the cache and all of the modules, one or more of the modules and no cache, some intermediate combination of the cache and modules, or only one of the modules or cache.

Preferably, the mapping lookup table 814 is used in combination with mapping module 812. However, alternate mapping methods may be used in another embodiment of the present invention including, without limitation, those implemented by IF-THEN-ELSE constructs or CASE tables. In a preferred embodiment, a memory buffer having data structure elements corresponding to row and column elements (e.g. coordinates) of the logic level table view 816 are recorded in a buffer as a mapping lookup table 814. The data structures in the mapping lookup table 814 preferably include mapping instructions, such as an identifier of the data table object corresponding to the row and column combination of the logic level table 816, the corresponding row and column combination of the underlying data table object 818 to which the coordinate corresponds, and/or a pointer to additional logic.

Upon receiving a cursor method call relating to a coordinate in logic table 816, the interception/delegation module 804 calls a mapping module 812 to determine the mapping to a corresponding coordinate in an underlying data table 818. The mapping module 812 locates the data structure corresponding to the coordinate of the virtual table 816 and returns to the interception/delegation module 804 an appropriate data table 818, row and column, and additional data corresponding to the coordinate in the underlying table. It should be understood that more than one data table object and coordinate combination may be returned by the mapping module if the cursor method applies to multiple data table objects. Moreover, it should be understood that more than one logic table object may be incorporated between logic table object 800 and data table objects 818. The interception/delegation module 804 calls a cursor method in each of the corresponding data table object 818 once the underlying table structure is defined.

With regard to supplemental functionality module 810, the interception/delegation module 804 intercepts a call from the caller and calls supplemental functionality module 810 to provide additional functionality. The supplemental functionality can consist of multiple stages, that is, the supplemental functionality module 810 can pre-process or post-process a delegation to one or more underlying data table objects 818. Alternatively, the supplemental functionality module 810 can completely replace a cursor method of an underlying data table 818, foregoing delegation and returning to the caller through the interception/delegation module 804 (without calling a cursor method in an underlying data table object 818). Examples of supplemental functionality include without limitation enforcing complex relationships among column values in a row when a caller attempts to change the values in a column, filtering server-side row or column reads depending on the security level of a caller, enforcing and managing complex relationships among different tables as those tables change, and triggering external functionality that lies outside the scope of the catalog tables, responsive to predetermined table changes. Triggering external functionality may also involve the triggering of events that relate to the changes made to the datastore, including loosely coupled events and other function calls.

Implementing the data tables to provide the functionality as described above enables the upper levels of abstraction and program code, including the catalog server, logic tables, runtime catalog, etc. to separate themselves from the primary aspects related to actually storing and retrieving data. The data tables provide an interface that is relatively independent of the type or format related to the particular datastore. Additionally, this particular method of interfacing with datastores makes it fairly simple to implement a new and different datastore. Additionally, the combination of the logic tables with the data tables provides the necessary location independence since desired configuration information stored in many different locations may be presented through a single logic table. Furthermore, the combination allows necessary services to be provided despite location or type of data stored in the various datastores.

Figure 9:
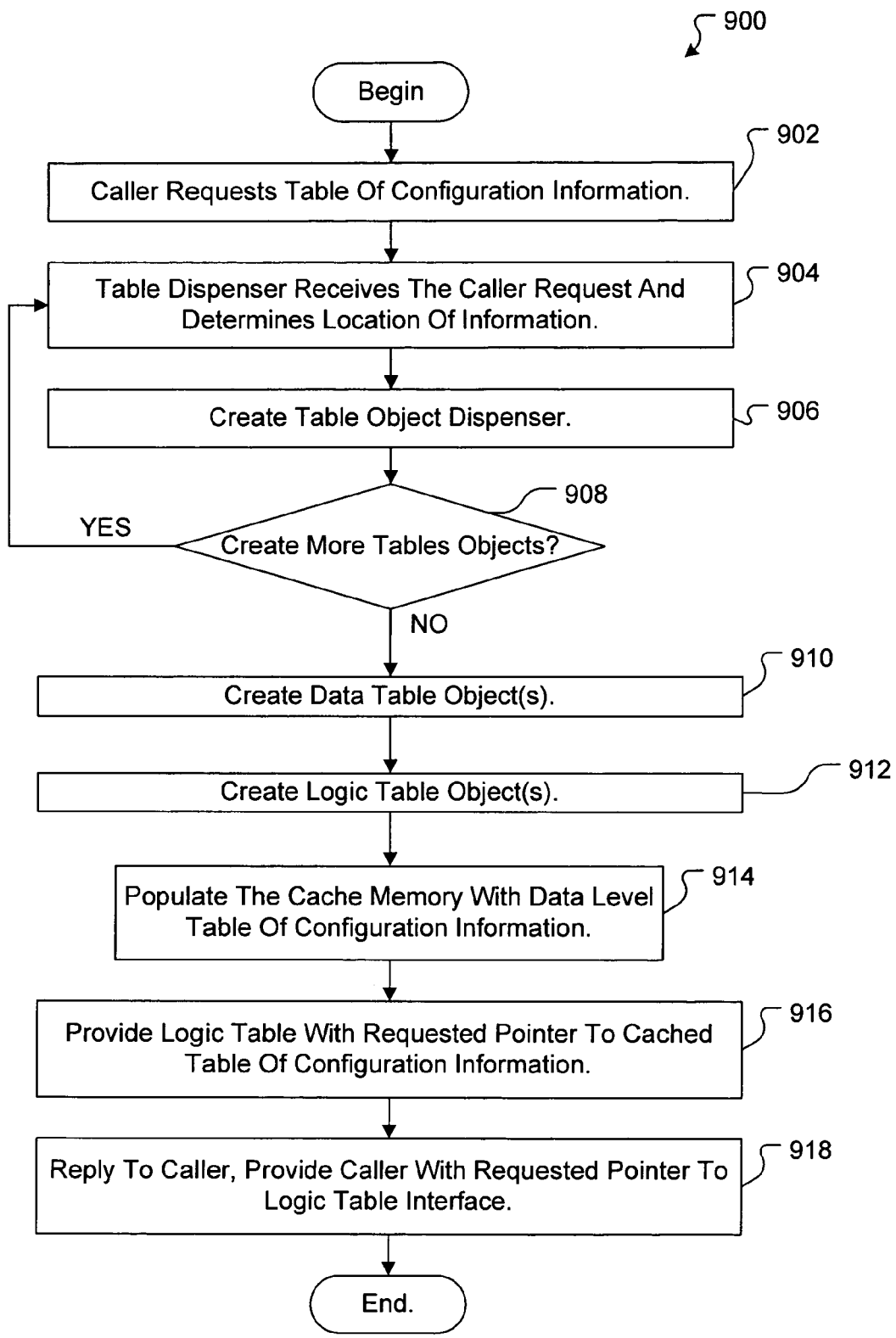
FIG. 9 represents a flow chart of logical operations creating an abstraction layer of the present invention.

The general operations involved with creating and using the combination of logic table objects and data table objects, such as table systems 400, 402, 404, 406 and 408 shown in FIG. 4 are shown at 900 in FIG. 9. Initially, the operation flow begins with request operation 902 wherein the caller requests a table of configuration information. In a preferred embodiment the request does not include particular information as to the location of any datastore or the type of any datastore. Instead the request includes a database ID, a table ID, and possibly a query related to the requested information. The caller sends this request to the catalog management system, and more particularly to the table dispenser.

Receive operation 904 in the table dispenser receives the request from the caller. The table dispenser may be either on the same computer system as the caller process or the table dispenser may be on another, remotely connected computer system. As part of operation 904, the table dispenser preferably analyzes the request and determines the location of the information. In an embodiment of the present invention, the information related to the various datastores and types of configuration information is stored in a "wiring database." The table dispenser uses the wiring database to analyze a request and determine the type of table object dispensers to create. Once the table dispenser determines the location of the information, create operation 906 creates a table object dispenser. The table object dispenser is an object that performs the function of creating either a data table object or a logic table object.

Following creation of the table object dispenser, decision operation 908 determines whether other table dispensers must be implemented or created. Preferably, each instance of a table dispenser contains the necessary information to determine whether other dispensers must be formed based on the parameters used during its creation.

If other table object dispensers are to be created then flow branches YES and a request for another table object is sent to the table dispenser. Process steps 904, 906 and 908 repeat until no other table object dispensers are to be created.

Following creation of the table object dispensers, create operation 910 create any and all data table objects necessary for the table system. Each table object dispenser designed to create a data table object executes its function of creating the data table objects at operation 910.

Once all the data table objects have been created, create operation 912 creates the logic table objects. In similar manner as the creation of the data table objects, create operation 912 uses the table dispensers designed to create logic table objects to perform the function of creating the logic table objects.

Preferably, the data table objects have read caches associated with them. As discussed above, some may only have a write cache, but most often a read cache is implemented along with the data table object. Accordingly, the read cache is preferably populated with configuration information prior to returning a pointer to the caller process. Therefore, populate operation 914 populates the cache following creation of the logic table objects. In alternative embodiments, the cache is populated before or simultaneously with the creation of the logic tables. Also, other embodiments do not populate the cache until requested to do so by the caller.

Following population of the cache, provide operation 916 provides the logic table object(s) with the pointer or pointers to the interfaces associated with the data table object(s) interfaces. In alternative embodiments, the creation of the logic table objects, operation 912, automatically returned pointers related to the data table objects directly to the logic table objects. In either case, providing the logic table objects with the proper pointers enables both interception and delegation of calls to the data table objects.

The process concludes with reply operation 918 which replies to the caller, providing the caller with a pointer to the logic table interface, and a cursor pointer to cached information, i.e., the logic level table.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-readable storage medium having computer-executable instructions stored thereon which when executed by a processor cause the processor to perform a method for creating an abstraction layer to provide configuration information to a caller wherein the information is stored in one or more datastores, the method comprising the steps of:

receiving a request for configuration information from the caller;

determining a location of the requested configuration information based on the request received from the caller;

creating an abstraction layer, comprising:
  one or more data table objects, each data table object comprising:
    a datastore interaction code for interacting with one of the one or more datastores and for retrieving the requested configuration information from the one of the one or more datastores, and
    a memory cache for storing the requested configuration information retrieved by the datastore interaction code; and
  a logic table object in communication with the one or more data table objects for synthesizing the requested configuration information and for providing the synthesized requested configuration information to the caller; and
providing a logic table object interface comprising a logic level table having the synthesized requested configuration information to the caller.

2. The computer-readable storage medium for performing the method as defined in claim 1 wherein the request is a type-independent request for configuration information.

3. The computer-readable storage medium for performing the method as defined in claim 2 wherein the requested configuration information is provided presented to the caller in tabular form in the logic level table.

4. The computer-readable storage medium for performing the method as defined in claim 2 wherein the abstraction layer provided logic table object interface activates external functionality in response to the request for configuration information.

5. The computer-readable storage medium for performing the method as defined in claim 1 wherein a first abstraction layer level is comprised of the one or more data table objects and a second abstraction layer level is comprised of the logic table objects.

6. A computer system for providing configuration information stored on one or more datastores in response to a request by a computer process caller, the system comprising:
  a processor; and
  a memory communicatively coupled to the processor, the memory having computer-executable instructions that when executed by the processor, perform a method comprising:
    receiving a request for configuration information from the computer process caller;
    determining a location of the requested configuration information based on the request received from the computer process caller;
    creating an abstraction layer module comprising:
      one or more data table objects, each data table object having a datastore interaction module and a cache memory for retrieving the requested configuration information from one of the one or more datastores; and
      a logic table object overlaying the one or more data table objects,
    verifying by the logic table object that the computer process caller meets security constraints for accessing the requested configuration information;
    after verifying that the computer process caller meets the security constraints, providing a logic table object interface module to the computer process caller having the requested configuration information.

7. The computer system as defined in claim 6 wherein the abstraction layer module further comprises:
  the datastore interaction module transferring the requested configuration information between the one of the one or more datastores datastore and the cache memory.

8. The computer system as defined in claim 6 wherein at least one of the one or more plurality of datastores is coupled to but remote from the computer system.

9. The computer system as defined in claim 6 wherein the abstraction layer module further comprises:
  an identifying module for identifying the one or more datastores and finding the requested configuration information stored thereon.

10. The computer system as defined in claim 6 wherein the abstraction layer module further comprises:
  a data table object interface module having the datastore interaction module adapted to retrieve the requested configuration information from the one of the one or more datastores and to populate the cache memory with the requested configuration information.

11. The computer system as defined in claim 10 wherein the abstraction layer module further comprises:
  the logic table object interface module having an interception/delegation module for receiving a query from the computer process caller and delegating commands to the data table object interface module for producing a logic level table having configuration information related to the query.

12. The computer system as defined in claim 7 wherein the datastore interaction module is the only module available to the computer process caller for storing new configuration data in the one or more datastores.

13. The computer system as defined in claim 6 wherein the abstraction layer module further comprises:
  a translation module for translating the requested configuration information between a datastore format in which the requested configuration information is stored on the one or more datastores and a cache memory format in which the requested configuration information is stored in the cache memory for manipulation by the computer process caller.

14. The computer system as defined in claim 6 wherein the abstraction layer module further comprises:
  a service module for providing services to the computer process caller in response to a call for configuration information.

15. The computer system as defined in claim 6 wherein the abstraction layer module further comprises:
  a presentation module for presenting configuration information to the caller wherein a portion of the configuration information is synthesized configuration information.

16. The computer system as defined in claim 15 wherein the abstraction layer module further comprises:
  a synthesizing module for synthesizing the requested configuration information retrieved from the one or more datastores.

17. The computer system as defined in claim 7 wherein the abstraction layer module further comprises:
  a validation module for inspecting and validating new configuration information to be stored on the one or more datastores in response to a request by the computer process caller.

18. A computer-readable storage medium having computer-executable instructions stored thereon which when executed by a processor cause the processor to perform a method for utilizing an abstraction layer to update configuration information stored in a datastore, the method comprising:

receiving on a data table object interface a request from a caller to update configuration information;

determining a location of the configuration information in the datastore based on the request received from the caller;

creating an abstraction layer, comprising:

a data table object, comprising:

a datastore interaction code for interacting with the datastore, wherein interacting includes retrieving configuration information from the datastore and updating configuration information on the datastore, a memory reading cache for storing the configuration information retrieved from the datastore, and a memory writing cache for storing proposed modifications to the configuration information retrieved from the datastore, and a logic table object for validating the proposed modifications to the configuration information;

validating the configuration information by the logic table object in response to the request from the caller; and updating the configuration information by the datastore interaction code after validation by the logic table object in response to the request from the caller.

19. The computer-readable storage medium for performing the method as defined in claim 18, wherein the data table interface activates external functionality in response to the request to update the configuration information.

20. The computer-readable storage medium for performing the method as defined in claim 18, wherein the logic table object verifies that the caller meets security constraints in response to the request to update the configuration information.

21. The computer-readable storage medium for performing the method as defined in claim 1, wherein the logic table object confirms that the caller meets security constraints before providing the synthesized requested configuration information to the caller.

* * * * *